United States Patent [19]
Kim et al.

[11] Patent Number: 6,028,373
[45] Date of Patent: Feb. 22, 2000

[54] POWER SUPPLY DISTRIBUTED LOAD STARTUP SYSTEM

[75] Inventors: Sang Hoon Kim, Hoffman Estates; Brian D. Chapman, Gurnee, both of Ill.

[73] Assignee: Motorola, Inc., Schaumburg, Ill.

[21] Appl. No.: 08/100,233

[22] Filed: Aug. 2, 1993

[51] Int. Cl.[7] .................................................. H02H 3/24
[52] U.S. Cl. ................................ 307/31; 307/32; 307/38; 307/130; 363/15; 363/21; 323/234; 323/901
[58] Field of Search ............................. 307/31, 32, 38, 307/39, 41, 52, 130, 11, 33, 34; 363/20, 21, 45, 49, 84, 89, 97, 15, 24, 25, 27, 71; 323/901, 234, 266; 318/52

[56] References Cited

U.S. PATENT DOCUMENTS

| | | | |
|---|---|---|---|
| 3,740,569 | 6/1973 | Carcia | 307/11 |
| 3,764,867 | 10/1973 | Smith | 318/52 |
| 4,034,232 | 7/1977 | La Venture | 307/32 |
| 4,122,514 | 10/1978 | Amin | 363/21 |
| 4,313,060 | 1/1982 | Fickenscher et al. | 307/23 |
| 4,510,564 | 4/1985 | Seer, Jr. | 363/23 |
| 4,590,546 | 5/1986 | Maile | 363/37 |
| 4,614,906 | 9/1986 | Maxham | 323/267 |
| 4,675,770 | 6/1987 | Johansson | 361/18 |
| 4,685,020 | 8/1987 | Driscoll et al. | 361/18 |
| 4,935,642 | 6/1990 | Obelode et al. | 307/32 |
| 4,970,623 | 11/1990 | Pintar | 361/187 |
| 5,313,381 | 5/1994 | Balakrishnan | 363/21 |
| 5,563,455 | 10/1996 | Cheng | 307/41 |

*Primary Examiner*—Albert W. Paladini
*Attorney, Agent, or Firm*—Nicholas C. Hopman

[57] ABSTRACT

A power supply system (300) provides a staged startup of multiple loads (303, 305). Preferably, the power supply (300) is a switching power supply that provides power, in the form of a primary output voltage to a first output terminal (319) and to a second output terminal (325). A first load (303) demands a first startup power from the switching power supply through the first output terminal (319). A voltage comparator (333) provides an enable signal (335) when a primary output signal, present at the first output terminal, exceeds a predetermined threshold (335). A load coupling device, preferably a gateable voltage regulator (331), is coupled to the second output terminal (325). The gateable voltage regulator (331) has an output (327) coupled to a second load (305). The gateable voltage regulator (331), responsive to the enable signal (335), provides a coupling between the second output terminal (325) and the second load (305), whereby the second load (305) demands a second startup power from the power supply through the second output terminal (325).

4 Claims, 4 Drawing Sheets

—PRIOR ART—

POWER SUPPLY DISTRIBUTED LOAD STARTUP SYSTEM

FIELD OF THE INVENTION

This invention is generally directed to the field of power supplies, and specifically to the aspect of reduction of power required at power supply startup.

BACKGROUND OF THE INVENTION

Power supply systems must not only provide operative power to loads during normal operating conditions, but also during startup or initialization of power to the loads. The demand for smaller product size has caused an evolution from relatively simple linear power supplies to more complex switching power supplies. FIG. 1 illustrates a power supply 101. This power supply 101 has multiple outputs connected to multiple loads 103, 105, and 107. Each of these loads have both a startup power requirement and an operating power requirement. These power requirements are illustrated in FIG. 2.

In FIG. 2 various waveforms associated with the startup power and operating power requirement for each of the loads 103, 105, and 107 is shown. For simplicity, a single waveform $V_{OUT}$ 201 shows a voltage over time representative of each of several voltages driving the loads 103, 105, and 107. Note that the voltage slowly rises 203 from zero to a stable voltage 205. During the transition 203 the loads 103, 105, and 107 are demanding the aforementioned startup power. When the voltage stabilizes, as shown at reference number 205, the loads 103, 105, and 107 are demanding operative power.

$I_{LOAD1}$ 207, $I_{LOAD2}$ 213, and $I_{LOAD"n"}$ 219, represent load currents demanded by each of the loads 103, 105, and 107. $I_{COMPOSITE}$ 225 represents the combined, or composite load current demanded from the power supply 101. A startup portion of each of the current waveforms is represented by reference numbers 209, 215, 221, and 227. An operating portion of each of the current waveforms is represented by reference numbers 211, 217, 223, and 229. The power demanded from the power supply 101 is the product of the voltage, represented simply by $V_{OUT}$ 201, and the composite current $I_{COMPOSITE}$ 225. Computation will show a fairly high startup power requirement for this power supply because of the fairly high startup current requirements of the individual loads 103, 105, and 107. High startup current can be partially attributable to cross-conduction in CMOS (complementary metal oxide semiconductor) integrated circuits, and other loads that are operating in an indeterminate state until their control circuits are powered-up.

Physical size, and stress, thus field reliability, of a power supply is dependent on this startup power requirement. This is true for simple linear, and more complex switching type power supplies. Inherently, switching power supplies have more internal components that are effected by both the startup power requirement and the operating power requirement. Since switching power supplies inherently switch on and off current through certain reactive components, these relatively high startup power demands especially tax certain components. Particularly, capacitors have a ripple current rating associated with a capacitor's ability to thermally recover from a transient change in current through the capacitor. As transient power demand increases linearly, the capacitor increases volumetrically to safely provide this power demand. Also certain inductors, indigenous to switching power supplies, must also increase volumetrically so that the core elements are not saturated during these relatively high power demands during startup.

Also, active switching elements, typically a FET (field effect transistors) or other type of semiconductor switch, need to have sufficient bulk to handle the high startup power demand. In any case, the FET will need to operate at a higher temperature to account for this increased power demand during startup.

Further, prior art switching power supplies require that the above-mentioned components have to be over-sized because of a minimum startup voltage problem inherent in these designs. Essentially, a source voltage for the switching power supply must be sufficiently high for the regulator to startup and operate properly. This becomes problematic when the switching power supply has a fairly high startup current demand and a current limiting circuit that limits power dissipation in the switching power supply. When the source voltage is applied to the switching power supply, the output voltage of the switching power supply starts to build. Responsive to this building voltage, the connected loads start to draw current. If the current demand exceeds the current limit, then the output voltage will be caused to reduce to a level coincident with a predetermined maximum power dissipation. This means that if the current limit isn't set high enough then the switching power supply's output voltage will never reach the specified voltage—thus not start up correctly. To prevent this from happening, the current limit needs to be set high enough to support a low source voltage startup sequence under the maximum startup loading condition. Setting the current limit higher requires volumetrically larger capacitors, inductors and a larger FET. Significantly, setting the current limit higher to accommodate this high startup current demand, also increases the headroom necessary to accommodate short circuit protection. For instance, if operating current is 5 amps, and startup current is 10 amps, then short circuit test limit must be above 10 amps. The additional headroom associated with this short circuit test limit will cause the aforementioned components to grow even larger and dissipate more power—thus heat.

As mentioned earlier, the switching power supply must also dissipate this extra power associated with the short circuit test limit, under a low source voltage condition during startup. Typically, the startup current associated with a switching power supply may be 200–300% of the maximum operating current. As mentioned earlier, this causes the inductors and capacitors to grow substantially in size. Also, the active switching element needs to be significantly over-sized to survive this substantial startup current.

What is needed is an improved power supply system that is relatively compact, reliable, easily manufacturable, and can efficiently manage these relatively high startup power demands.

BRIEF DESCRIPTION OF THE DRAWINGS

FIG. 4 is a chart of waveforms associated with operation of the system illustrated in FIG. 3.

DETAILED DESCRIPTION OF A PREFERRED EMBODIMENT

A system provides a distributed load startup apparatus that minimizes startup power required from a power supply, by staging the startup of multiple loads. Because of this minimization of startup power, certain key components may be downsized, saving space and cost, and the power supply can operate more reliably because thermal dissipation can be minimized.

Preferably, the power supply is a switching power supply that provides a primary power, in the form of an output voltage, to a first output terminal and to a second output terminal. A first load demands a first startup power from the switching power supply through the first output terminal. A voltage comparator provides an enable signal when the primary output voltage, present at the first output terminal, exceeds a predetermined voltage threshold. Alternatively, a signal representative of power or current demanded may be compared to a threshold to generate the enable signal. A load coupling device, preferably a gateable voltage regulator, is coupled to the second output terminal. The gateable voltage regulator has an output coupled to a second load. The gateable voltage regulator, responsive to the enable signal, provides a coupling between the second output terminal and the second load, whereby the second load demands a second startup power from the power supply through the second output terminal. This approach ensures that the startup load power demanded from the first load stabilizes to a lower operating power before the second load is connected and demanding startup power. Because of this, the composite startup power is less than the summation of both load's startup power demand. Of course, this approach may be extended to add more staged loads by slightly modifying this same apparatus.

Figure 1:
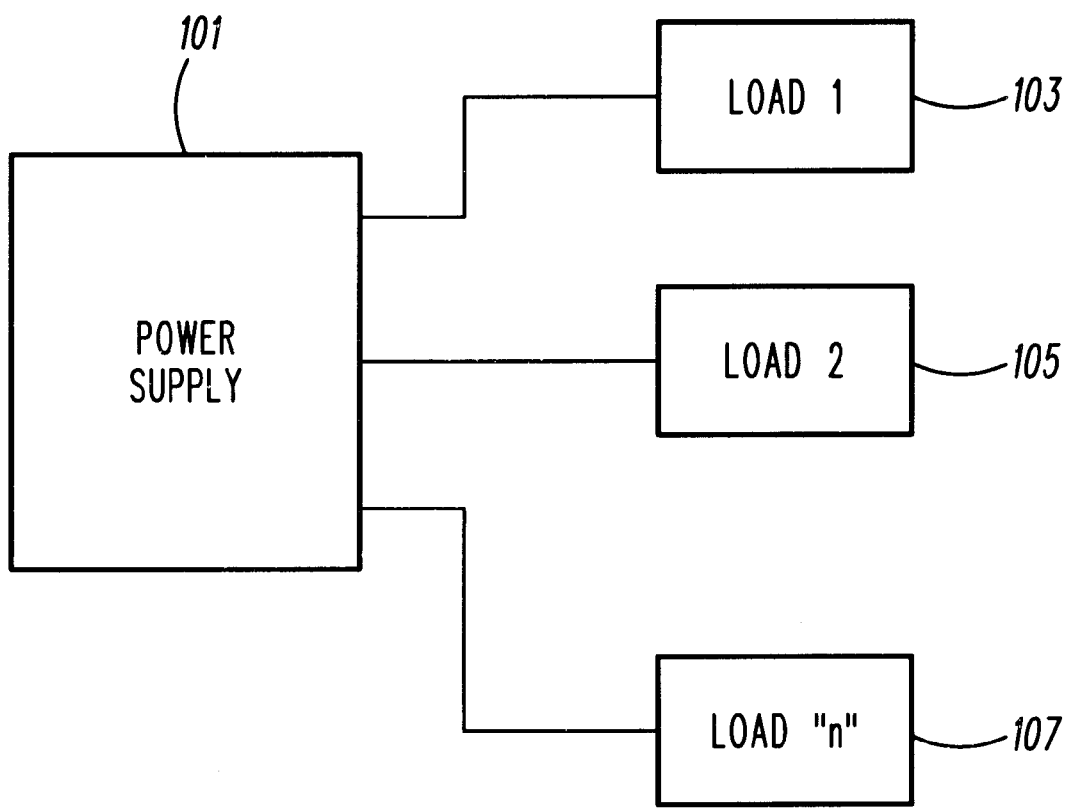
FIG. 1 is a system block diagram illustrating a general configuration of a power supply driving multiple loads as known in the prior art.
Figure 2:
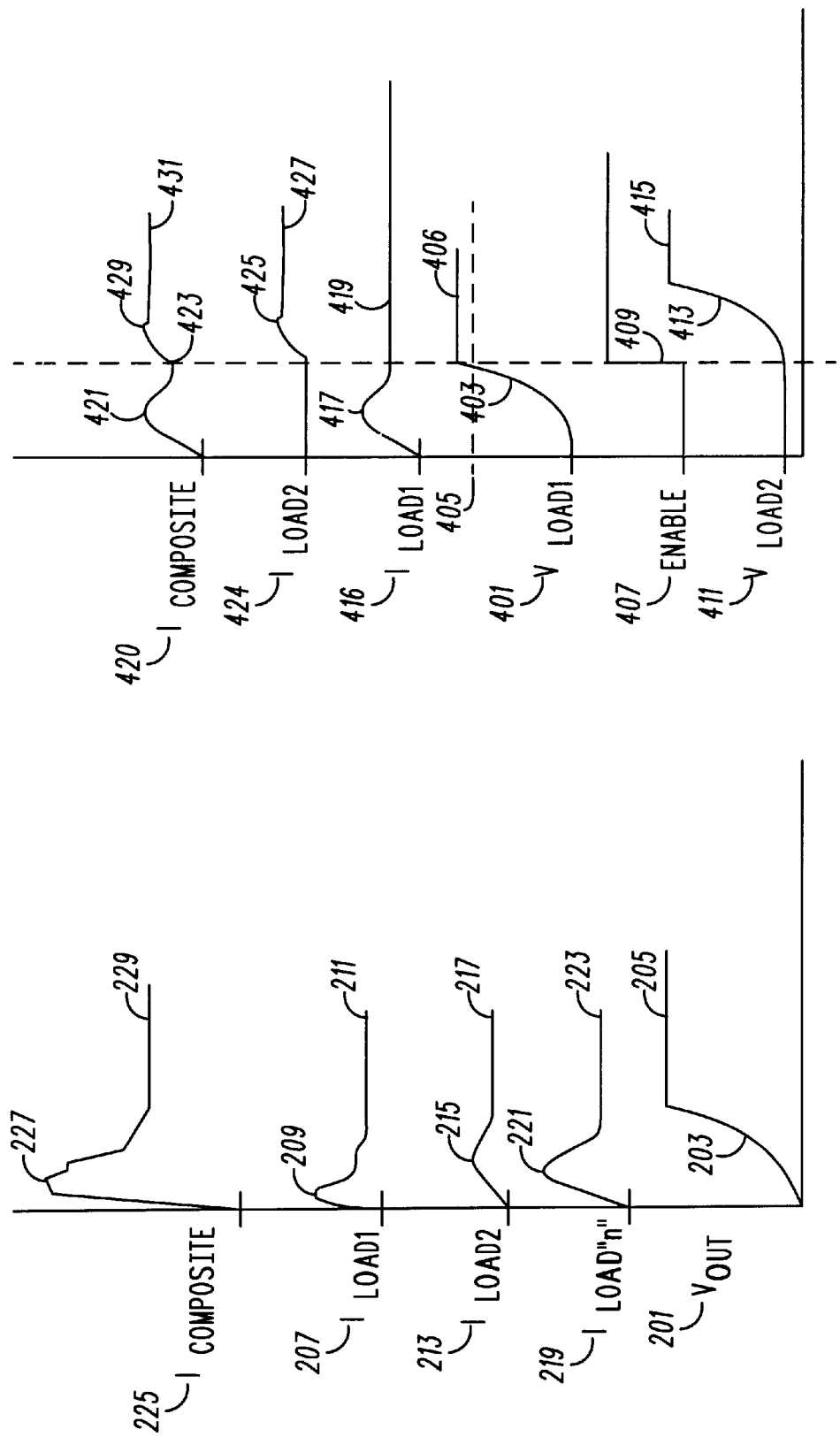
FIG. 2 is a chart of waveforms associated with operation of the prior art system shown in FIG. 1.

FIGS. 1 and 2 were introduced in the background section of this application and essentially describe the high startup power demand problem existing in the prior art.

Figure 3:
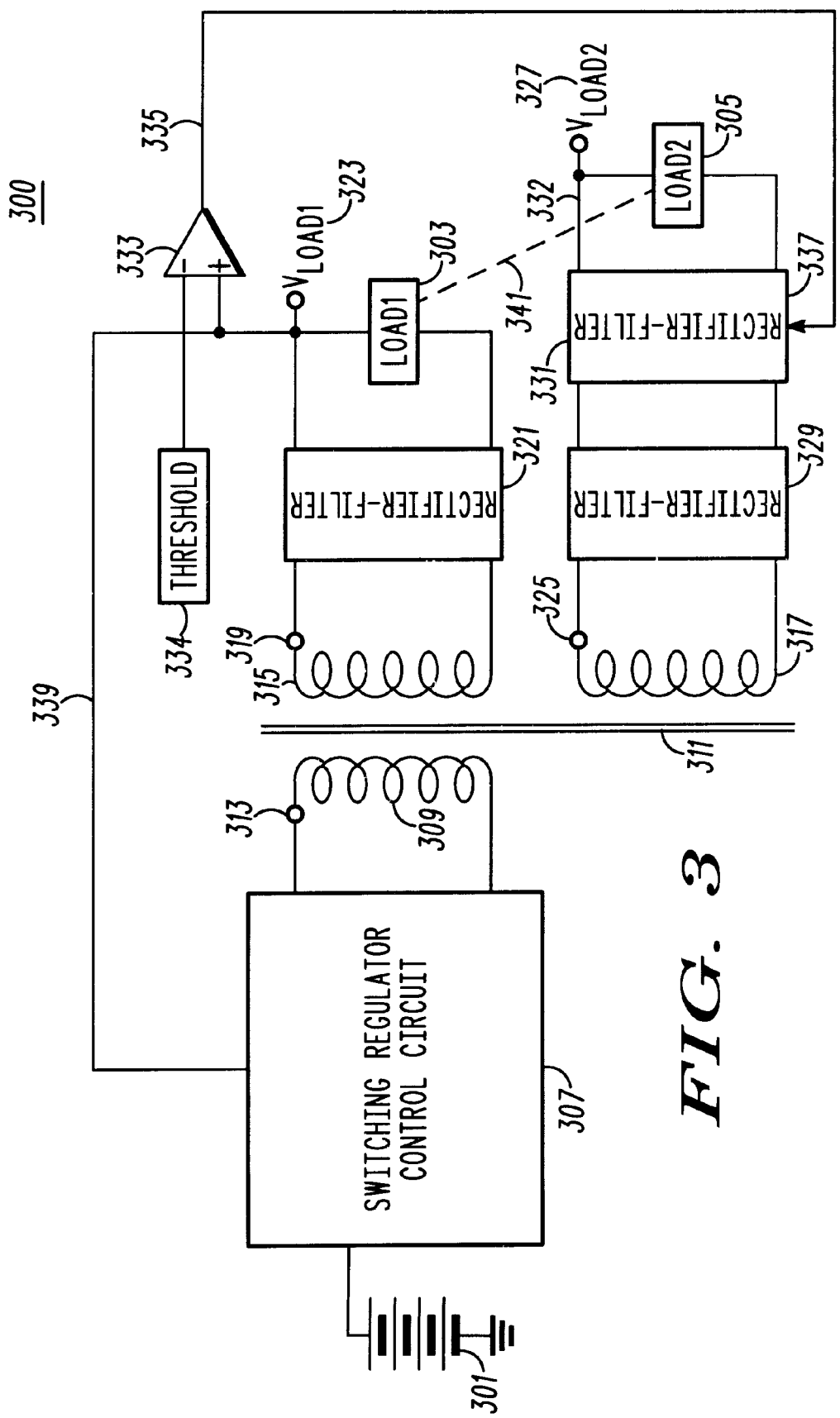
FIG. 3 is a general system block diagram in accordance with the invention.

FIG. 3 is a system block diagram illustrating a general configuration of the improved power supply, or distributed load startup apparatus. Preferably, this improved power supply is installed in a vehicle powered by a battery 301. Alternatively, many other applications and configurations can benefit from the described system. The battery 301 provides power to the power supply which ultimately provides power to various loads, here represented by reference numbers 303 LOAD1 and 305 LOAD2. The battery 301, or other power source, is coupled to the power supply, in this case a switching regulator control circuit 307. The switching regulator control circuit 307, is coupled to and driving a primary winding 309 of a transformer 311. A primary output voltage is provided at a terminal 313.

The transformer 311 has at least a first secondary winding 315, and a secondary winding 317. The primary output voltage, provided at a terminal 313, is coupled via the transformer 311 to the secondary windings 315 and 317. A first, or first secondary, output terminal 319, provides a first voltage that is coupled to a terminal ($V_{LOAD1}$) 323 through a rectifier-filter device 321 to the first load, LOAD1 303. A second, or second secondary, output terminal 325, provides a second voltage that is coupled to a terminal ($V_{LOAD2}$) 327 through a rectifier-filter device 329 and a gateable regulator 331 having an output 332 to the second load, LOAD2 305.

A comparison means, in this case a voltage comparator 333, is coupled to a threshold element 334 that provides a threshold voltage, and also to the ($V_{LOAD1}$) terminal 323, which provides a voltage representative of the first voltage provided by the first secondary output terminal 319.

Note that elements 307, 309, 315, 321, and the feedback path shown by reference number 339 in combination form a voltage regulator. Although in the preferred embodiment the aforementioned gateable regulator 331 has regulation capabilities this is not necessary for operation of the improved system. However, in typical power supply systems this device includes regulation because it doesn't benefit from the regulation action caused by the feedback signal associated with the line shown by reference number 339.

Now that some of the essential elements have been introduced, the introduction of the remaining elements and the operation of the circuit in FIG. 3 will be described concurrently. Both FIG. 3 and FIG. 4 will be referenced in this next description. FIG. 4 illustrates various waveforms that illustrate the operation of the circuit in FIG. 3.

When power is applied to the switching regulator control circuit 307 from the battery 301, the switching regulator control circuit 307 will commence operation. This means that the switching regulator control circuit 307 will cause the primary output voltage, provided at a terminal 313 to switch on and off at a relatively high frequency thus providing a primary output voltage at terminal 313. Since the primary output voltage is coupled, via the transformer 311, to the first secondary winding 315, the voltage at the first secondary output terminal 319 will respond to this primary output voltage by increasing. This will, through the action of the rectifier-filter element 321, cause the voltage $V_{LOAD1}$ 323 to increase. This increase in voltage $V_{LOAD1}$ 323 is shown in waveform 401 of FIG. 4 at reference number 403. While this voltage $V_{LOAD1}$ 323 is increasing, the first load LOAD1 303 starts demanding a primary startup power from the switching regulator control circuit 307, through the first secondary output terminal 319. This is startup power is dependent on the demanded load current which is shown in waveform $I_{LOAD1}$ 416. Until the load, thus the load current demand, stabilizes, its power demand thus the load current demanded from the switching regulator control circuit 307, will behave in a transient manner as shown by reference number 417. As mentioned in the background section, this transient load startup current—thus power may be partially attributable to cross-conduction in CMOS (complementary metal oxide semiconductor) integrated circuits, or initial charging of capacitors associated with LOAD1 303, and other loads that are operating in an indeterminate state until their respective control circuits are powered-up.

Another waveform, $I_{COMPOSITE}$ 420 illustrates, at reference number 421, this transient load startup current 417— thus power demanded from the switching regulator control circuit 307. Since the second load is not activated at this time, the transient load startup current 417 shown in the composite waveform $I_{COMPOSITE}$ 420 is much smaller than in the prior art circuit. This is because a demand from the second load is not present.

When the voltage $V_{LOAD1}$ 323 increases above the threshold voltage, shown in FIG. 4 at reference number 405 and provided by the threshold element 334, an enable signal 335 will be generated. The first load's power demand stabilizes when the voltage $V_{LOAD1}$ 323 stabilizes, as shown by reference number 406, shortly thereafter. As a result the transient startup load current is reduced to a steady-state operating current. This is shown in waveforms $V_{LOAD1}$ 401, $I_{LOAD1}$ 416, at reference number 419, and $I_{COMPOSITE}$ 420, at reference number 423. The threshold voltage is indicative of this stabilization.

The enable signal 335 is illustrated graphically in FIG. 4 in reference waveform 407, and is shown activated at reference number 409 responsive to the comparator's 333 action. This enable signal 335 is coupled to a control input 337 on the gateable regulator 331. When the enable signal 335 is provided, The gateable regulator 331 causes a coupling between the second output terminal 325 and the output 332 and the second load 305. Prior to this action caused by the enable signal, no voltage, was applied to the second load 305 or at the output 332. Thus, the second load 305 did not demand any current, thus power. As a result of the coupling, the second load 305 demands startup power from the switching regulator control circuit 307 through the second output terminal 325. The result of this demanded startup power is a startup load current shown in waveform $I_{LOAD2}$ 424 at reference number 425, and also in the $I_{COMPOSITE}$ 420 waveform at reference number 429. The demanded startup load power is the product of the load current, shown in waveform 424 and the increasing load voltage $V_{LOAD1}$ 327 shown in waveform 411 of FIG. 4 at reference number 413.

Of course, other means, such as a measurement of the stabilization of startup current or startup power demand may also be applied to determine the stabilization of the startup current of the first load and thereby the enablement of the second load.

Note that because LOAD1 303 is already stable, it may, via a control coupling 341, provide a stable control signal to the second load 305. This control coupling represents, for instance, a microprocessor's output control signals, associated with LOAD1 303, controlling an input to a solenoid circuit of LOAD2 305. By doing so, the second load 305 is able to startup more gracefully, thus demanding less current during its startup phase. This is because the control input deciding the state of the current demanding elements, indigenous to LOAD2 305 can now startup in a stable state.

The second load's power demand stabilizes when the voltage $V_{LOAD2}$ 327 stabilizes, as shown by reference number 415, shortly thereafter. As a result the startup load current is reduced to a steady-state operating current. This is shown in waveforms $V_{LOAD2}$ 411, $I_{LOAD2}$ 424, at reference number 427, and reflected in a new $I_{COMPOSITE}$ 420, at reference number 431. At this time $I_{COMPOSITE}$ 420 now represents both the operating current attributable to the $I_{LOAD1}$ demand and the $I_{LOAD2}$ demand.

Because the startup of these multiple loads 303 and 305 is staged, responsive to the stabilization of the previously starting load, the total instantaneous current, thus power demanded from the power means, in this case the switching regulator control circuit 307, is reduced compared to prior art circuits. This allows capacitors, inductors, resistors, and transistors in the switching regulator control circuit 307 and the rectifier-filters 321, 329, to be sized significantly smaller than in prior art designs. These elements will be illustrated next in FIG. 5. This also reduces the power requirement for the transformer 311.

Figure 5:
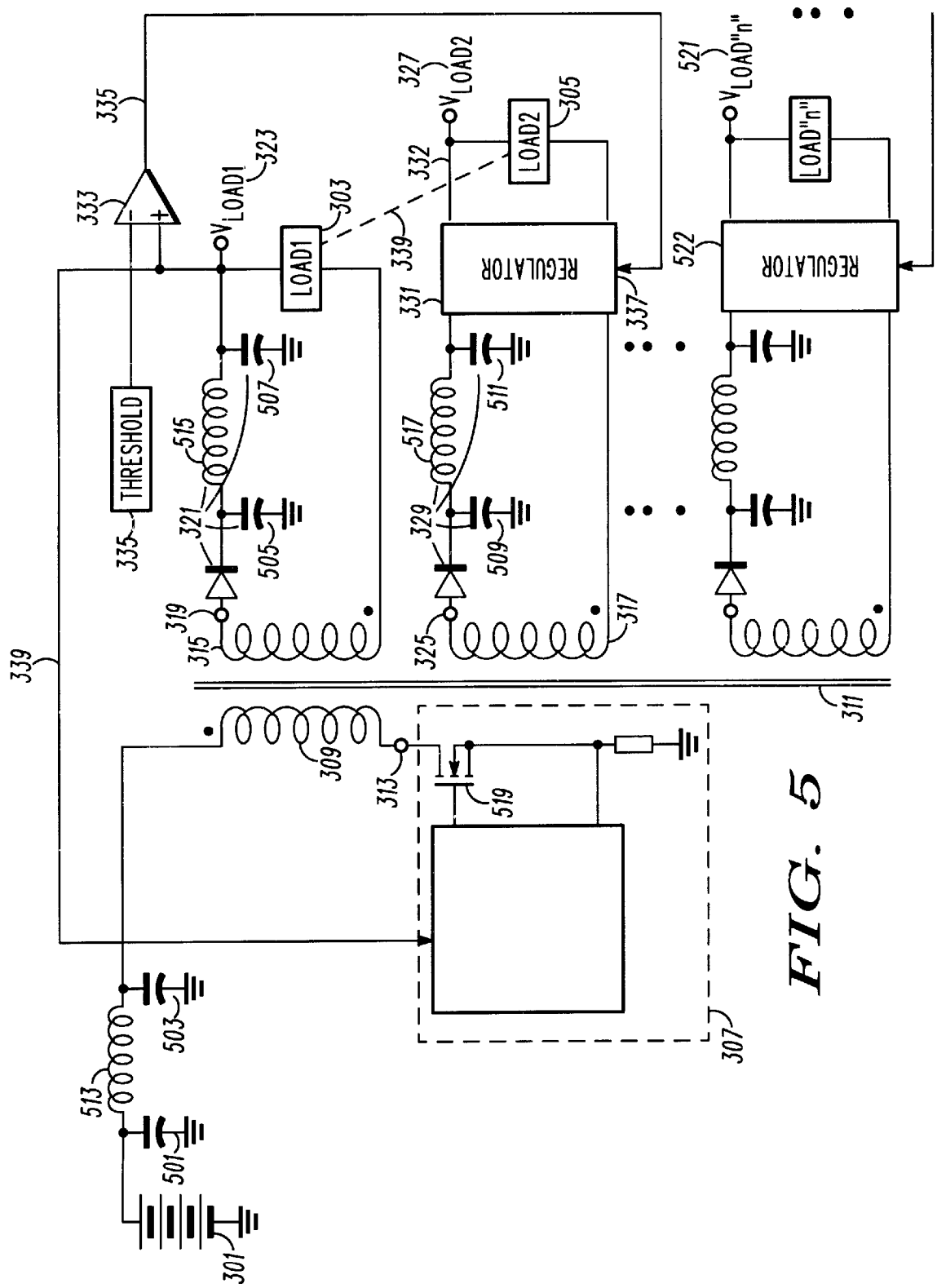
FIG. 5 is a detailed system block diagram in accordance with the invention.

FIG. 5 is a system block diagram showing additional details of the circuit shown in FIG. 3. Capacitors 501, 503, 505, 507, 509, and 511 may be sized substantially smaller than prior art designs because ripple current, associated with the demanded load current, can be reduced significantly. Inductors 513, 515, 517 and the transformer 511, can also be sized substantially smaller than prior art designs because the demand for load current can be reduced significantly. Similarly, the FET 519 may also be reduced in size and be asked to dissipate less heat. All of these improvements make the system more manufacturable, more compact, less costly, and more reliable.

As mentioned above, this approach may be extended to add more staged loads by slightly modifying this same apparatus. An example of this is shown in FIG. 5 with $V_{LOAD"n"}$ 521 and switched regulator 522 which can be switched either directly based on the output of comparator 333 or indirectly based on the output of an additional comparator which monitors the output 332.

In conclusion, this system provides a distributed load startup apparatus that minimizes instantaneous startup power required from a power supply. Because of this minimization of startup power, certain key components may be downsized and the power supply can operate more reliably because thermal dissipation can be minimized. Also, the minimum startup voltage problem, inherent in prior art designs, greatly diminished in this case because the high startup load current demands that cause the problem have been reduced by the staged turn-on. Additionally, the headroom associated with a short circuit test limit need not grow the load current demand beyond a point manageable by the key components.

What is claimed is:

1. A power supply for providing power to at least a first and second load, the power supply comprising:
    a power supply for providing voltage to the first load via a terminal;
    a comparator coupled to the terminal for providing a signal when the voltage provided to the first load exceeds a fixed threshold; and
    a voltage regulator coupled between the power supply and the second load, the voltage regulator providing operative power to the second load responsive to the provided signal, wherein magnitudes of currents flowing through the first load and the second load are different.

2. A switching power supply distributed load startup system having a primary load and a secondary load, said system comprising:
    a switching power supply having a primary circuit output for providing power;
    a first secondary output circuit coupled to the primary circuit output of said switching power supply for providing the power to said primary load through a first output terminal;
    a second secondary output circuit coupled to the primary circuit output of said switching power supply for providing the power to said secondary load through a second output terminal;
    a voltage comparator coupled to the first output terminal of said first secondary output circuit, said voltage comparator for providing an enable signal responsive to a voltage present at the first output terminal exceeding a predetermined voltage threshold; and
    a gateable voltage regulator connected to the second output terminal of said second secondary output circuit, said gateable voltage regulator including an output coupled to the secondary load, said gateable voltage regulator being responsive to the enable signal to provide a coupling between the second output terminal and the second load.

3. A switching power supply in accordance with claim 2 wherein the primary circuit output comprises a primary winding of a transformer and each of the first and second secondary output circuit's comprise secondary windings coupled to the primary winding of the transformer.

4. A power supply for providing current to at least a first and second load, the power supply comprising:
    a power supply for providing operative current to the first load via a terminal; and
    a regulator coupled to the power supply, the regulator for providing operative current to the second load, while a signal measured at the terminal exceeds a predetermined threshold.

* * * * *